3,141,883
PROCESS FOR PREPARING DICHLOROCYANURIC ACID SODIUM SALT

Pierre Chassaing and Georges Clerc, Saint-Auban, France, assignors to Pechiney-Compagnie de Produits Chimiques et Electrometallurgiques, Paris, France
No Drawing. Filed July 6, 1962, Ser. No. 208,113
Claims priority, application France July 10, 1961
8 Claims. (Cl. 260—248)

This invention relates to a new and improved process for the preparation of sodium dichlorocyanurate or the sodium salt of dichlorocyanuric acid. Dichlorocyanuric acid, which has previously been prepared, as by the process of the French Patent 1,149,758, is sparingly soluble in water and therefore can be easily separated from aqueous suspension for use as a raw material in the preparation of the sodium salt of dichlorocyanuric acid in accordance with the practice of this invention.

Sodium dichlorocyanurate has previously been prepared in dilute concentration in aqueous medium by the addition of an alkaline sodium compound to an aqueous suspension of dichlorocyanuric acid. However, it has been difficult to obtain the salt in an anhydrous state because the chlorine atoms of the compound are very labile and cause decomposition or breakdown of the cyanuric acid molecule, sometimes with explosive violence.

When heated to a temperature above 15° or 20° C., irreversible reaction takes place with the formation of secondary products to the detriment of the active chlorine of the dichlorocyanuric acid.

In the attempt to prepare a concentrated solution of the sodium salt of dichlorocyanuric acid, the addition of the alkaline sodium compound has been accompanied with rapid external cooling to compensate for the heat of reaction in the attempt to prevent rise to breakdown temperature since an explosive reaction is possible responsive to a rise in temperature.

While such cooling is possible where small quantities are involved, such cooling to control the reaction becomes more difficult in the preparation of large commercial quantities. Thereafter, the water has to be removed at the lowest possible temperature, such for example as by distillation at ambient temperature. In the light of the foregoing, such processes have been found to be slow, costly and dangerous and therefore not adapted to use on a commercial scale for the preparation of substantially anhydrous sodium dichlorocyanurate.

It is an object of this invention to provide a process for the preparation of the sodium salt of dichlorocyanuric acid (sodium dichlorocyanurate) and especially the anhydrous salt without the objectionable features of the processes that have heretofore been employed.

Another object is to provide a method for the preparation of such salt of dichlorocyanuric acid without the generation of excess heat such as will cause a rise in temperature and it is a related object to produce a compound of the type described directly from the reactants with only a small amount of water present which can be easily, economically and safely removed without decomposition of the salt.

The concepts of this invention reside in combining dry dichlorocyanuric acid with a dry neutralizing mixture containing hydrated sodium carbonate such as in the form of sodium carbonate decahydrate, $Na_2CO_3 \cdot 10H_2O$, or sodium carbonate heptahydrate, $Na_2CO_3 \cdot 7H_2O$, with the thought that the heat required for the decomposition of the hydrated sodium carbonate will absorb heat given off responsive to the neutralization of the dichlorocyanuric acid with the result that the combined reaction will take place with little, if any, rise in temperature. It is desirable to make use of an amount of decahydrate or heptahydrate or other hydrated sodium carbonate to provide for thermic equilibrium during the reaction with the dichlorocyanuric acid.

In accordance with the preferred practice of this invention, dry, crystalline sodium carbonate decahydrate is employed in an amount calculated for neutralization of the dichlorocyanuric acid in accordance with the following equation:

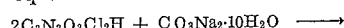
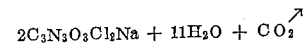

$$2C_3N_3O_3Cl_2H + CO_3Na_2 \cdot 10H_2O \longrightarrow 2C_3N_3O_3Cl_2Na + 11H_2O + CO_2\uparrow$$

In practice, the two ingredients are mixed together at about ambient tempearture and the reaction is completed within approximately one hour.

A preferred procedure is to introduce the finely divided sodium carbonate decahydrate into a mixer and slowly add the dichlorocyanuric acid with mixing over the course of about one-half hour. The mixing is continued until the reaction is substantially completed as evidenced by the cessation of the release of carbon dioxide.

Instead of the usual rise in temperature experienced in processes heretofore employed, the reaction is carried out in accordance with the practice of this invention without any noticeable rise in temperature. Instead, a lowering of temperature is usually experienced whereby the temperature may drop to as low as 0° C. during the reaction. As a result, it becomes unnecessary to provide for external cooling of the reaction vessel.

The heat absorbed for the decomposition of the sodium carbonate decahydrate corresponds to the 20,000 calories of the heat of formation and the absorption of heat exceeds the heat released by salification or sodium neutralization of the two molecules of dichlorocyanuric acid. Thus large quantities of ingredients can be combined in a commercial process without the necessity to take precautions for control of temperature to prevent overheating during the reaction, for this overheating may result in the loss of active chlorine.

The product that is secured upon completion of the reaction contains very little water, substantially only that released by the reaction, which is calculated to correspond to less than 1 part by weight of water per 2 parts by weight of dry salt. The reaction product is thus usually secured in the form of a thick paste which can be dried, in whole or in part, in thin layers, as by air drying at ordinary temperature for a few hours. The elimination of the last traces of water for complete drying to produce an anhydrous salt can be achieved without risk at temperatures of 100° C. or less since the dry or nearly dry product is quite stable at these temperatures. Instead of the removal of water by air drying followed by elevated temperature drying, the water present can be completely and directly removed as by spray drying, with or without vacuum, and with or without heat.

Although the utilization of hydrated sodium carbonate alone as a reactive component is a preferred method for the practice of the invention, the invention also contemplates the combination which makes use of the hydrated sodium carbonate as one of the sodium alkaline compounds in combination or in admixture with other neutralizing agents. It is not absolutely necessary for cooling to take place during the reaction since it will be sufficient to carry out the reaction without rise in temperature and preferably without rise to a temperature of about 20° to 25° C. As a result, the hydrated sodium carbonate may be used in admixture with anhydrous sodium carbonate or bicarbonate as long as the neutralizing mixture contains enough hydrated sodium carbonate to maintain thermal equilibrium during neutralization for the absorption of heat of neutralization. This equilibrium can be achieved by the use of equimolecular mixtures of decahydrated sodium carbonate or heptahydrated sodium carbonate and anhydrous sodium carbonate.

The following examples are given by way of illustration, but not by way of limitation, particularly with respect to the mixing and drying operations which can be carried out under other conditions and by other means.

*Example 1*

70.2 kg. of sodium carbonate decahydrate are introduced into a mixer and then 100 kg. of dichlorocyanuric acid (titrating 71% active chlorine; i.e. 99% of the theoretical quantity) are introduced in small increments with mixing. The operation lasts about one hour during the course of which the temperature will fall to 0° C. 158 kg. of paste is secured as a product.

The paste is spread out in a thin layer on suitable receptacles and allowed to air dry at about ambient temperature for about 12 hours and thereafter it is dried for 24 hours at 85° C. The resulting dry product, weighing 109 kg., corresponds to a yield of 99% theoretical of sodium dichlorocyanurate and titrates 63.1% of active chlorine (98% of the theoretical quantity).

*Example 2*

In the same installation as that used for Example 1, 80 kg. of dichlorocyanuric acid having 70.2% active chlorine (98% of the theoretical quantity) are added slowly to a mixture of 28.6 kg. of sodium carbonate decahydrate and 10.4 kg. of anhydrous sodium carbonate. The admixture and reaction is conducted over a period of one hour. During the addition and mixing, the temperature will not change appreciably. The paste product, weighing 109 kg., is dried as in Example 1, first at ambient temperature and then at 99° C. for 24 hours.

83.5 kg. of sodium dichlorocyanurate (97% of the theoretical quantity) titrating 62.7% of active chlorine (97.3% of the theoretical quantity) are collected and crushed.

*Example 3*

In the same installation as that used for the preceding Examples 1 and 2, 80 kg. of dichlorocyanuric acid having 70.2% of active chlorine (98% of the theoretical quantity) are slowly added to 46 kg. of sodium carbonate heptahydrate with mixing. During the addition, the temperature of the reactive mass falls to about 3° C. and the mixing operation is stopped and reaction completed after about one hour.

The paste product is dried in the same conditions as previously described in Examples 1 or 2. 80 kg. of sodium dichlorocyanurate (94% of the theoretical quantity) titrating 63.2% of active chlorine (98% of the theoretical quantity) are collected.

It will be apparent that the described process for preparing sodium dichlorocyanurate in accordance with the practice of this invention is characterized by a process which enjoys great simplicity and which can be carried out at relatively low cost. It permits large quantities of product to be prepared with inexpensive equipment and with greatly improved safety and it is also effective in providing a reaction in which the active chlorine of the dichlorocyanuric acid is retained in the final product.

It will be understood that changes may be made in the details of formulation conditions and the conditions of reaction without departing from the spirit of the invention, especially as defined in the following claims.

We claim:

1. A process for the preparation of sodium dichlorocyanurate comprising the steps of combining dry dichlorocyanuric acid with a hydrated sodium carbonate in dry powder form, said sodium carbonate and dichlorocyanuric acid being present in a theoretical amount substantially corresponding to the reaction $$2C_3N_3O_3Cl_2H + CO_3Na_2 \cdot 10H_2O \longrightarrow$$
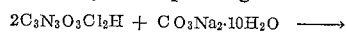
$$2C_3N_3O_3Cl_2Na + 11H_2O + CO_2\uparrow$$

whereby heat of neutralization of the dichlorocyanuric acid is absorbed by the hydrated sodium carbonate to minimize rise in temperature during the reaction.

2. A process for the preparation of sodium dichlorocyanurate comprising the steps of combining dichlorocyanuric acid with a hydrated sodium carbonate in dry powder form, said hydrated sodium carbonate being selected from the group consisting of sodium carbonate decahydrate and sodium carbonate heptahydrate, whereby heat of neutralization of the dichlorocyanuric acid is absorbed by the hydrated sodium carbonate to minimize rise in temperature during the reaction.

3. A process in accordance with claim 2 wherein the selected hydrated sodium carbonate is employed in admixture with a substantially equimolecular amount of one of the members of the group consisting of anhydrous sodium carbonate and bicarbonate.

4. A process for the preparation of anhydrous sodium dichlorocyanurate comprising the steps of mixing dry dichlorocyanuric acid with a hydrated sodium carbonate in dry powder form, said sodium carbonate and dichlorocyanuric acid being present in a theoretical amount substantially corresponding to the reaction, $$2C_3N_3O_3Cl_2H + CO_3Na_2 \cdot 10H_2O \longrightarrow$$
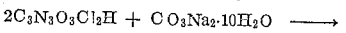
$$2C_3N_3O_3Cl_2Na + 11H_2O + CO_2\uparrow$$

said mixing step providing for the production of sodium dichlorocyanurate in a paste containing water of reaction, said process including drying of the paste to produce the anhydrous sodium dichlorocyanurate as a product.

5. A process for the preparation of anhydrous sodium dichlorocyanurate comprising the steps of mixing dry dichlorocyanuric acid with a hydrated sodium carbonate in dry powder form, said sodium carbonate being selected from the group consisting of sodium carbonate decahydrate and sodium carbonate heptahydrate, said mixing step providing for the production of sodium dichlorocyanurate in a paste containing water of reaction, said process including drying of the paste to produce the anhydrous sodium dichlorocyanurate as a product.

6. A process for the preparation of sodium dichlorocyanurate comprising the steps of combining dichlorocyanuric acid with sodium carbonate in dry powder form, said sodium carbonate including at least in part hydrated sodium carbonate in an amount at least sufficient to absorb the heat of neutralization of the dichlorocyanuric acid in the resulting reaction to thereby minimize any rise in temperature during the reaction.

7. A process in accordance with claim 6 wherein a paste containing water of reaction and sodium dichlorocyanurate is produced with the water content of said paste comprising less than one part by weight for every two parts by weight of the sodium dichlorocyanurate.

8. The process as claimed in claim 1 in which the reaction is carried out until completion as indicated by the cessation of the release of carbon dioxide.

References Cited in the file of this patent

UNITED STATES PATENTS 2,913,460    Brown et al. _____ Nov. 17, 1959

FOREIGN PATENTS 219,930    Australia _____ Jan. 22, 1959
551,042    Canada _____ Dec. 31, 1957

OTHER REFERENCES

The Merck Index, 6th Ed., pages 875–876, Merck and Co., Rahway, New Jersey (1952).

Remy, "Treatise on Inorganic Chemistry," vol. 2, pages 738–739 and 743, Elsevier Publishing Co., New York (1956).